Jan. 4, 1944.    M. J. KERMER    2,338,117
SEPARATOR FOR EVAPORATORS
Filed Nov. 12, 1940    2 Sheets-Sheet 1

Martin J. Kermer INVENTOR
BY Park & Pope
ATTORNEYS.

Jan. 4, 1944.      M. J. KERMER      2,338,117
SEPARATOR FOR EVAPORATORS
Filed Nov. 12, 1940      2 Sheets-Sheet 2
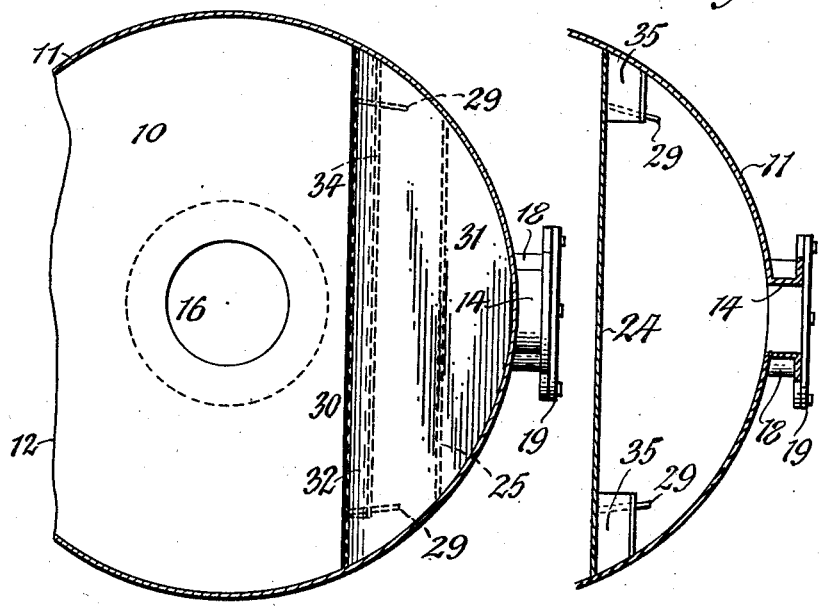
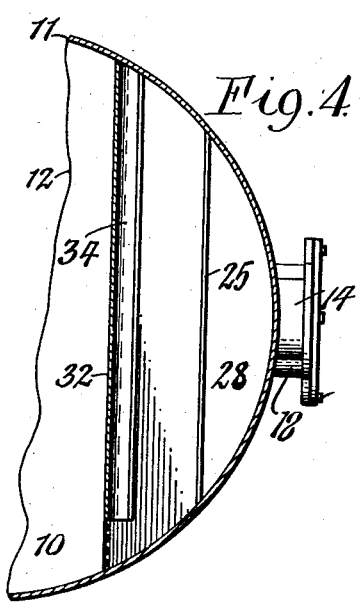
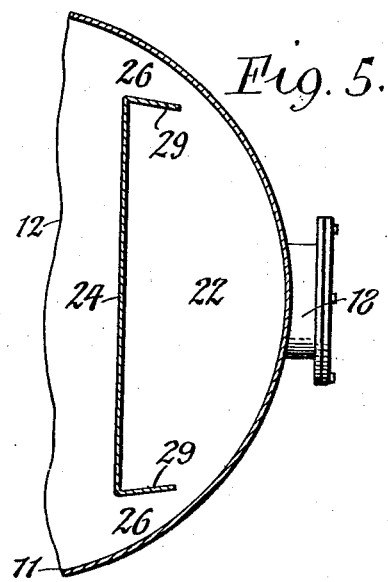
INVENTOR
Martin J. Kermer
BY
ATTORNEYS Patented Jan. 4, 1944

2,338,117

UNITED STATES PATENT OFFICE 2,338,117

SEPARATOR FOR EVAPORATORS

Martin J. Kermer, Buffalo, N. Y., assignor to Buffalo Foundry & Machine Co., Buffalo, N. Y., a corporation of New York Application November 12, 1940, Serial No. 365,217

3 Claims. (Cl. 183—110)

This invention relates to a separator for evaporators whereby a liquid, after having been heated or while being heated and converted into a mixture of liquid and vapor is operated upon for the purpose of eliminating the vapor and collecting the liquid separately.

In such evaporators the heating element and the separator generally are connected by substantial passages at top and bottom. Liquid flows from the bottom of the separator to the bottom of the heating element, passes through the heating element and flows from the top of the heating element back into the separator. During this process vapor usually is formed in the heating element which it is desired to separate from the balance of the liquid, generally for the purpose of concentrating the solid content of the liquid, sometimes for the purpose of recovering the vapor if this is the more valuable constituent, and sometimes to accomplish both these purposes.

In one form of separators for this purpose, as heretofore constructed, the heated mixture of liquid and vapor upon entering the separating chamber was deflected downwardly in the latter by a deflector or baffle. Inasmuch, however, as this baffle had the form of a downwardly opening hood or spout which was closed at its sides and upper end, a turbulence was created in the space between this hood-shaped baffle and the side of the separator which caused a relatively high resistance which in turn increased the absolute pressure on the incoming heated fluid mixture and thus reduced the output of the evaporator and increased the cost of operation accordingly.

It is well known that when a fluid is forced to change direction, as occurs when using an elbow or hood-shaped baffle, a considerable turbulence is created which results in a certain amount of resistance to this flow and that this resistance is several times as great as that of a straight pipe of the same diameter and length.

When a mixture of liquid and vapor is considered, conditions are found to be even more complicated. Since the mixture of liquid and vapor occupies a much greater volume than that of the liquid from which it is formed the velocity of the mixture entering the separator is of considerably greater magnitude and resistance is correspondingly greater than in the absence of vapor. In addition to a loss of energy, the turbulence also tends to break up the liquid into drops which form a spray. As the function of the separator is to separate the liquid from the vapor, the hood-shaped baffle has a tendency to make this separation more difficult by the formation of this spray.

When the mixture of liquid and vapor passed the deflector or baffle and entered the body of the separator as heretofore constructed a final flashing took place. Such flashing is apt to break up the liquid still further into small drops which are easily carried along and entrained by the vapor. In the separator body the liquid should flow downward while the vapor generally moves upward to the vapor outlet. Since the whole body of liquid and vapor passed through the hood-shaped deflector all of the vapor usually had to change its direction from a downward course to an upward course in order to separate from the liquid. At this point the velocity of the vapor was sufficiently high to entrain and to carry away the finer particles of liquid toward the top of the separator.

One of the objects of this invention is to provide baffle means whereby the heated fluid mixture upon entering the separator will be directed downwardly into the lower part of the separating chamber and any vapor separated from the liquid by these baffle means will be delivered into the upper part of the separating chamber thus practically eliminating back pressure on the incoming heated fluid mixture, thereby effecting an economy in the operation of the evaporator and increasing its capacity.

It also is an object of this invention to provide baffle means which practically eliminates flash evaporation of the liquid after the heated fluid mixture passes the baffle means and also avoids the formation of small drops of liquid which can readily be entrained by the vapor.

It is a further object of this invention to provide baffle means whereby the vapor is given an opportunity to pass into the separator out of contact with the main body of the liquid and in the direction leading to the vapor outlet.

It is another object of this invention to provide baffle means which reduces the turbulence in the baffle chamber and the formation of a spray of fine particles of liquid.

Another object of this invention is to provide baffle means whereby entrained liquid particles are removed from the vapor before the latter leaves the separator body.

In the accompanying drawings:

Figs. 3, 4, 5 and 6 are fragmentary, horizontal sections, on an enlarged scale, taken on the correspondingly numbered lines in Fig. 1.

In the following description similar characters of reference indicate corresponding parts in the several figures of the drawings:

Figure 1:
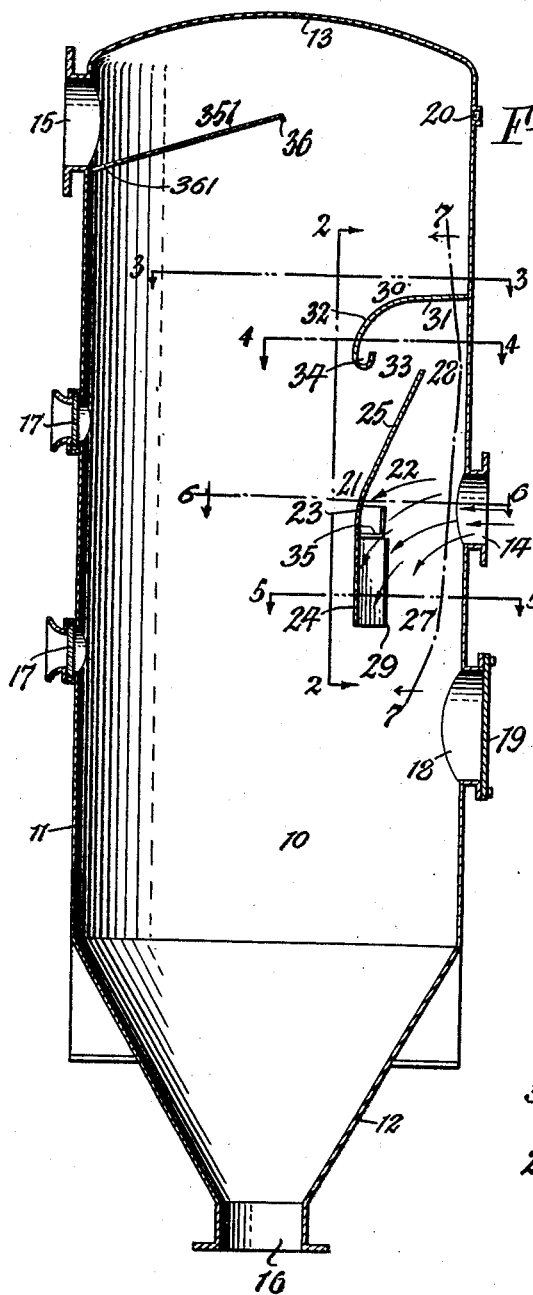
Fig. 1 is a vertical section of an evaporator embodying a satisfactory form of this invention.

The numeral 10 represents the separating chamber of the separator which is formed within a hollow body having an upright cylindrical wall 11, a downwardly tapering bottom 12 and an upwardly dished head 13 preferably constructed of sheet metal. Between its upper and lower ends the wall of the separator is provided with an inlet 14 through which the heated fluid mixture of liquid and vapor is fed from a fluid heater into the separator. On the opposite side of this wall and adjacent to the upper head of the body the same is provided with an outlet 15 for the vapor or gas which has been separated from the liquid, said outlet being connected with any suitable exhausting means for forcibly withdrawing the vapors or gases therefrom. At the lower end of the tapering bottom of the body the same is provided with an outlet 16 for discharging from the separating chamber the liquid from which vapor or gas has been removed preparatory to reheating the liquid and recirculating the same through the separator or disposing of the same otherwise. On one side of the upright wall of the body the same may be provided with the usual windows 17, 17 through which the operation within the separating chamber may be observed and its opposite side near the lower part thereof may be provided with a manhole 18 which affords access to the interior of the separating chamber for cleaning, inspecting and repairing, this manhole being normally closed by a cover 19. Near the top of the body the same is provided with an opening 20 for the reception of a valve whereby air may be admitted if the separating chamber is operated under vacuum and it is desired to break said vacuum.

Figure 2:
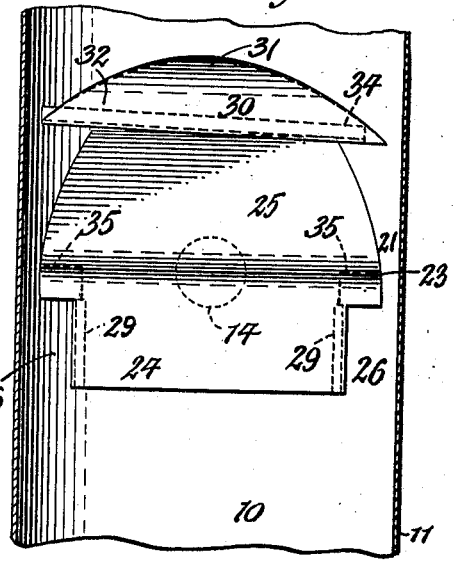
Fig. 2 is a fragmentary vertical section of the same taken on line 2—2, Fig. 1.
Figure 7:
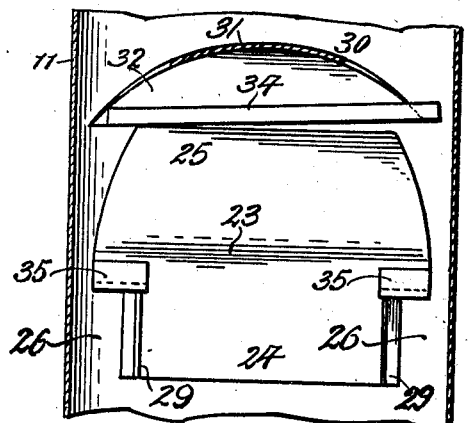
Fig. 7 is a fragmentary, vertical section taken on line 7—7, Fig. 1.

As the heated fluid mixture enters the separating chamber through the inlet 14 in the side thereof the same is intercepted by the improved baffle means whereby the liquid and vapor are separated in accordance with this invention and which are preferably constructed as follows:

The numeral 21 represents a main baffle, deflector or interceptor plate which is arranged in an upright position within the separating chamber opposite the inner end of the fluid mixture inlet 14 and forms with the adjacent part of the body wall a baffle chamber 22. This main baffle plate is spaced from the adjacent part of the body wall and has a comparatively wide and vertically curved central part 23 which is in line with the fluid inlet 14 and is connected at its transversely opposite ends with the adjacent parts of the body wall, a vertical lower part 24 which extends downwardly from said central part 23 below said fluid inlet 14 and terminates at its horizontally opposite edges short of this body wall and an upper part 25 which inclines upwardly and outwardly from the upper end of the central part 23 toward the body wall and has its side edges connected with the latter. Two side passages 26 are thus formed between the horizontally opposite edges of the lower section 24 of the main baffle plate and the adjacent parts of the body wall, a wide lower passage 27 is formed between the lower part 24 of the main baffle plate and the body wall and an upper narrow passage 28 is formed between the upper part 25 of this main plate and the body wall, as best shown in Figs. 1, 2 and 5.

As the stream of heated fluid mixture is fed through the inlet 14 it enters the central part of the baffle chamber 22 and strikes the curved central part 23 of the main baffle plate 21 so that the liquid in this mixture is deflected downwardly in the baffle chamber and most of the vapor which at this time separates has an opportunity to pass upwardly into the separator body through the passage 28. As the liquid flows downwardly in the baffle chamber 22 it is discharged therefrom through the large lower passage 27 into the lower part of the separating chamber and then escapes through the outlet 16 in the lower end of the latter. The vapor which is separated from the liquid entering the baffle chamber passes upwardly in the latter and through the relatively small upper passage 28 of this chamber and into the upper part of the separating chamber and is ultimately discharged through the outlet 15 of the same. When the heated fluid mixture enters the baffle chamber the liquid and vapor constituents which are separated from each other at this time are not greatly retarded in their movement and are free to move downwardly and upwardly respectively in the baffle chamber 22 and escape therefrom through the lower and upper passages 27 and 28 into the separating chamber. As a consequence this form of baffle practically eliminates any back pressure on the incoming fluid mixture which otherwise would increase the temperature of this mixture and require more pressure to properly feed the same into the separator and also reduce the yield of the apparatus. The lower passage 27 is made as large as possible so that the heated liquid and residual vapor can escape freely into the lower part of the separating chamber. Due to bending the upper part 25 of the main baffle plate toward the adjacent part of the body side wall the vapor passage 28 is smaller than the liquid passage 27, and thus retards the passage of liquid and vapor mixture therethrough and increases the removal of vapor from the liquid accordingly.

As the stream of heated fluid mixture drops from the baffle chamber into the lower part of the separating chamber the residual part of the vapor in the liquid is separated therefrom and this vapor is carried upwardly in the separating chamber and discharged through the outlet 15 of the same.

The vapor which is separated from the liquid upon entrance of the fluid mixture into the baffle chamber is further removed from contact with the main body of liquid by the escape of released vapor from the baffle chamber through the side passages 26 into the central part of the separating chamber. In order, however, to prevent any liquid entrained in the vapor from being carried by the freed vapor into the central part of the separating chamber the opposite vertical edges of the lower part 24 of the main baffle plate are provided with upright intercepting flanges 29 which project outwardly and are slightly inclined toward each other, as shown in Figs. 2, 3, 5, 6 and 7, so as to form, in effect, upright channels or troughs, the concave or open sides of which face each other and which catch liquid entrained in the vapor passing around the vertical ends of the lower part 24 of the main baffle plate and direct the liquid into the lower part of the separating chamber so that the same cannot again become entrained in the vapor, thereby increasing the separating capacity of the apparatus accordingly. Along the upper edge of each side passage 26 on the side facing the baffle chamber 22 an upwardly opening gutter or trough 35 is provided which catches any liquid which may run downwardly on those parts of the main baffle immediately above the side passages 26 and direct this liquid into the vertical troughs 29, thereby preventing such liquid from dropping off the lower edges of the horizontally opposite parts of the central and upper sections 23, 25 of the main baffle plate and dropping into the stream of vapor passing through the side passages 26, 26 and becoming entrained therein.

For the purpose of catching any liquid which may be entrained in the vapor discharged upwardly from the baffle chamber through its upper passage 28 supplemental or auxiliary baffle means are provided which are constructed as follows:

The numeral 30 represents a supplemental baffle plate which is arranged within the separating chamber above the main baffle plate 21 so as to overhang the upper passage 28 of the baffle chamber 22 and which is connected at its outer and side edges with the adjacent part of the body wall. This supplemental baffle plate has a substantially horizontal outer part 31 and a downwardly curved inner part 32 which terminates vertically in line with the upright part 24 of the main baffle plate and is separated from the latter by an intervening passage 33. At its lower edge the inner curved part 32 of the supplemental baffle plate is provided with a transverse channel, gutter or trough 34 which opens upwardly and inclines from one end toward the other.

Those vapors which are discharged upwardly from the baffle chamber 22 through the upper passage 28 are intercepted by engagement with the underside of the supplemental baffle plate 30 which latter directs these vapors downwardly and inwardly through the passage 33 into the upper part of the separating chamber. While the vapors thus engage the underside of the supplemental baffle plate any liquid entrained therein is separated therefrom and caught in the gutter 34 which latter conducts this liquid to one side of the evaporator body where it can drop into the liquid in the lower part of the separating chamber without liability of again becoming entrained in the vapors and lost through the outlet 15 of the evaporator.

As an additional precaution against loss of liquid through the upper outlet 15 of the separating chamber, the inner side of the latter is provided with a final or guard baffle 351 consisting of an inclined plate extending about half way across the interior of this chamber below the outlet 15 and provided at its inner edge with a downwardly projecting scraping flange 36, as shown in Fig. 1.

As the vapors or gases rise in the separating chamber the same are deflected by the final baffle plate 351 away from the outlet and compelled to pass around the inner edge of this baffle before they can escape. During this movement of the vapors liquid entrained therein is deposited on the underside of the final baffle plate and as the vapors pass around the flange 36 the latter further removes any liquid contained in the vapors, which removed liquid flows down the inclined underside of the final baffle plate and the wall of the body and joins the liquid in the lower part of the separating chamber. Any liquid separated from the vapors by engagement with that part of the top 13 above the baffle plate 351 will drop onto the upper side of the latter and direct the same to the adjacent side wall portion of the separating chamber due to the inclination of this baffle plate in this direction. Upon reaching the outer edge of the baffle plate 351 the liquid on its upper side passes downwardly through a small drain opening 361 in this plate and onto the adjacent part of the body side wall and into the lower part of the separating chamber. By this means any liquid dropping onto the baffle plate 351 will not become entrained in the vapor carried away through the vapor outlet 15 but instead will be returned to the main body of the liquid in the lower part of the separating chamber.

By providing as much as possible for removal of vapor before liquid passes out of the baffle chamber any final separation of vapor and liquid will take place at comparatively low velocity without danger of entrainment.

I claim as my invention:

1. A separator for evaporators comprising a separating chamber having an inlet between its upper and lower ends for a mixture of liquid and vapor, a liquid outlet at its lower end and a vapor outlet at its upper end; and baffle means for separating liquid and vapor including a baffle plate arranged within said chamber opposite said inlet and adapted to intercept the mixture of liquid and vapor entering the same and forming a wall of an upright baffle chamber the lower end of which opens downwardly and is adapted to discharge the liquid in the mixture downwardly into the lower part of said separating chamber and the upper end of which opens upwardly into the upper part of said separating chamber and discharges the vapor of the mixture thereto, the upper part of said plate being wide and connected at its opposite upright edges with the wall of said separating chamber and the lower part of said plate being narrow and separated at its opposite upright edges from the adjacent parts of the separating chamber wall by horizontal passages and the upright edges of said narrow lower part of the plate being provided on the side facing said inlet with vertical channels which have their concave sides facing each other.

2. A separator for evaporators comprising a separating chamber having an inlet between its upper and lower ends for a mixture of liquid and vapor, a liquid outlet at its lower end and a vapor outlet at its upper end; and baffle means for separating liquid and vapor including a main baffle plate arranged within said chamber opposite said inlet and adapted to intercept the mixture of liquid and vapor entering the same and forming a wall of an upright baffle chamber the lower end of which opens downwardly and is adapted to discharge the liquid in the mixture downwardly into the lower part of said separating chamber and the upper end of which opens upwardly into the upper part of said separating chamber and discharges the vapor of the mixture thereto and a supplemental plate arranged in the separating chamber over the upper outlet of said baffle chamber and having a substantially horizontal outer part connected with the adjacent part of the separating chamber wall and a downwardly curved inner part and said inner part being provided on its lower edge with an upwardly opening channel which faces the underside of said supplemental plate and inclines from one of its ends toward the other end thereof.

3. A separator for evaporators comprising a separating chamber having an inlet between its upper and lower ends for a mixture of liquid and vapor, a liquid outlet at its lower end and a vapor outlet at its upper end; and baffle means for separating liquid and vapor including a baffle plate arranged within said chamber opposite said inlet and adapted to intercept the mixture of liquid and vapor entering the same and forming a wall of an upright baffle chamber the lower end of which opens downwardly and is adapted to discharge the liquid in the mixture downwardly into the lower part of said separating chamber and the upper end of which opens upwardly into the upper part of said separating chamber and discharges the vapor of the mixture thereto, said plate having the opposite edges of its upper part connected with the wall of the separating chamber and the opposite edges of its lower part spaced from said wall to form passages and that side of said baffle plate facing said liquid and vapor mixture inlet being provided adjacent to the upper edge of said passages with upwardly opening troughs.

MARTIN J. KERMER.